(12) United States Patent
Eng et al.

(10) Patent No.: US 9,161,675 B2
(45) Date of Patent: Oct. 20, 2015

(54) HOUSEHOLD APPLIANCE INCLUDING INFORMATION LIGHT DEVICE

(71) Applicant: BSH Home Appliances Corporation, Irvine, CA (US)

(72) Inventors: Lindsay Eng, Long Beach, CA (US); Michael Georg Rosenbauer, Reimlingen (DE); Metin Tastan, Dillingen (DE); Ralf Winkler, Wittislingen (DE)

(73) Assignee: BSH Home Appliances Corporation, Irvine, CA (US)

( * ) Notice: Subject to any disclaimer, the term of this patent is extended or adjusted under 35 U.S.C. 154(b) by 108 days.

(21) Appl. No.: 13/647,441

(22) Filed: Oct. 9, 2012

(65) Prior Publication Data

US 2013/0027214 A1  Jan. 31, 2013

Related U.S. Application Data

(63) Continuation-in-part of application No. 29/410,163, filed on Jan. 5, 2012, now Pat. No. Des. 675,792, which is a continuation-in-part of application No. 13/043,504, filed on Mar. 9, 2011, now Pat. No. 8,556,439.

(51) Int. Cl.
*G08B 21/00* (2006.01)
*A47L 15/42* (2006.01)
*D06F 39/00* (2006.01)
*D06F 39/12* (2006.01)

(52) U.S. Cl.
CPC ............ *A47L 15/4293* (2013.01); *D06F 39/005* (2013.01); *A47L 15/4257* (2013.01); *D06F 39/12* (2013.01)

(58) Field of Classification Search
None
See application file for complete search history.

(56) References Cited

U.S. PATENT DOCUMENTS

| | | | |
|---|---|---|---|
| 5,151,884 A | 9/1992 | Griffith et al. | |
| 5,660,452 A | 8/1997 | Bales et al. | |
| 5,836,669 A | 11/1998 | Hed | |
| 6,295,004 B1 | 9/2001 | Burnett | |
| 6,837,591 B2 | 1/2005 | Tufte | |
| 2005/0105910 A1* | 5/2005 | Light | 398/137 |
| 2006/0232997 A1* | 10/2006 | Rosenbauer et al. | 362/621 |
| 2008/0106429 A1* | 5/2008 | Kaczmarek et al. | 340/679 |

(Continued)

FOREIGN PATENT DOCUMENTS

| | | |
|---|---|---|
| DE | 10022206 A1 | 2/2002 |
| EP | 0691100 A1 † | 1/1996 |

(Continued)

OTHER PUBLICATIONS

Chris Burns, "A Quad of Energy Efficiency," online: http://www.yankodesign.com/2010/06/23/a-quad-of-energy-efficiency/, Jun. 23, 2010.

(Continued)

*Primary Examiner* — Ojiako Nwugo
(74) *Attorney, Agent, or Firm* — James E. Howard; Andre Pallapies

(57) ABSTRACT

A household appliance includes an information light device that projects light onto a surface to enable a user to determine whether or not the household device is in operation. The information light device may include a light guide. The light guide may be disposed along a side portion of the household appliance.

20 Claims, 27 Drawing Sheets

(56) References Cited

U.S. PATENT DOCUMENTS

| | | |
|---|---|---|
| 2008/0236563 A1 | 10/2008 | Wilsdorf |
| 2010/0147338 A1 | 6/2010 | Busing et al. |
| 2012/0224146 A1* | 9/2012 | Katou .............................. 353/20 |

FOREIGN PATENT DOCUMENTS

| | | | |
|---|---|---|---|
| EP | 2189727 A1 | 5/2010 | |
| WO | 2004057636 A1 † | 7/2004 | |
| WO | 2008073049 A1 | 6/2008 | |

OTHER PUBLICATIONS

Electrolux, "Electrolux Insight 60cm Integrated Dishwasher with Light Bar-ESI68850X," online: Appliancedirect.uk.com and Electrolux.com, 2010.

\* cited by examiner
† cited by third party

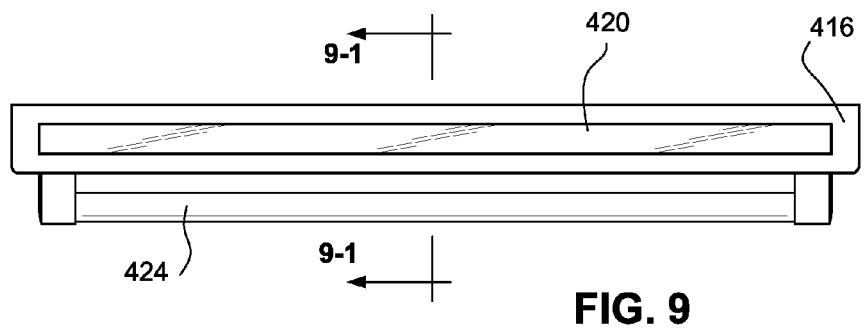
FIG. 9
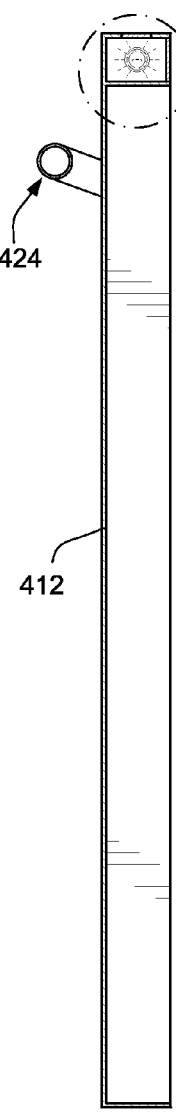
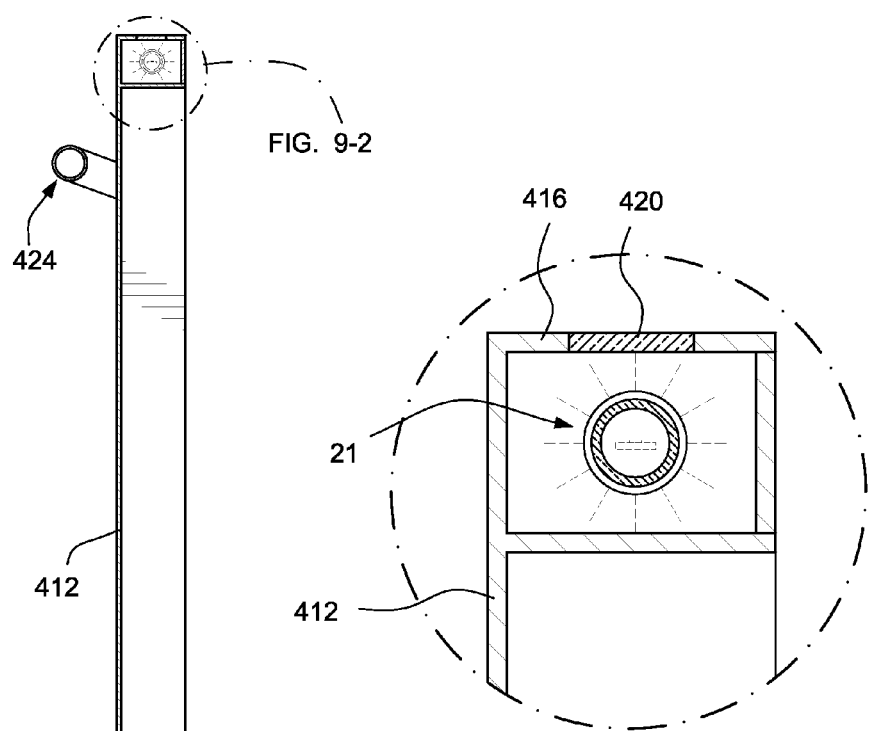
FIG. 9-2
FIG. 9-1

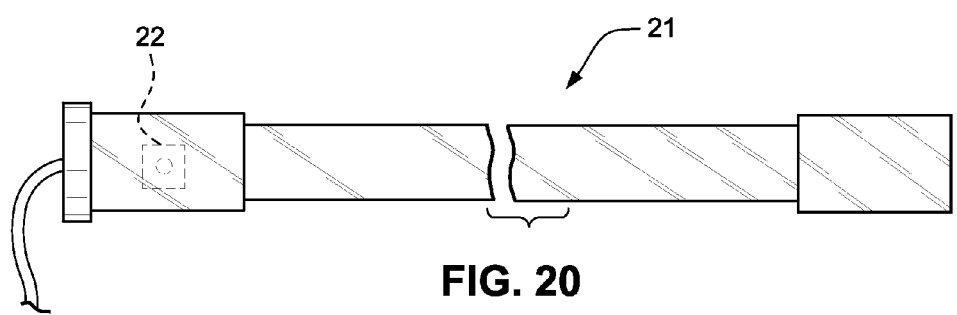
FIG. 20
FIG. 21  FIG. 22

US 9,161,675 B2

HOUSEHOLD APPLIANCE INCLUDING INFORMATION LIGHT DEVICE

CROSS-REFERENCE TO APPLICATION

This application claims the benefit of and is a continuation-in-part of U.S. application Ser. No. 29/410,163, filed Jan. 5, 2012, which is a continuation-in-part of U.S. application Ser. No. 13/043,504, filed Mar. 9, 2011. Each application mentioned above is incorporated herein by reference in its entirety.

BACKGROUND OF THE INVENTION

1. Field of the Invention

The present invention relates to a household appliance and more particularly, to a household appliance including an information light device and method thereof that allows a user of the household appliance to determine when the household appliance is in operation or not.

2. Related Art

In the related art, household appliances, such as dishwashers typically generate enough noise that a user may tell by the noise whether or not the dishwasher is in operation. However, some dishwashers may be so quiet that a user cannot hear when the dishwasher is in operation. Therefore, some of these dishwashers currently have an "infolight spot" where a light spot projected from the dishwasher shines on a kitchen floor, indicating that the dishwasher is in operation. When the wash cycle ends and the dishwasher turns off, the dishwasher turns off the infolight spot so that the light spot on the kitchen floor disappears. By the appearance and disappearance of the light spot, the user knows when the dishwasher is in operation or not.

The present invention introduces a household appliance with an information light device referred herein as an "infolight glow", where instead of a light spot, the infolight glow produces a band or stripe of light (e.g., about as long as a width of the household appliance) onto the floor to indicate an operating status of the household appliance.

SUMMARY OF THE INVENTION

One aspect of the invention is to provide a visual indication of whether or not an appliance is in operation which can be seen from relatively far distances (e.g., from the other side of the room or from an adjacent room).

Another aspect of the invention relates a household appliance comprising an information light device disposed adjacent a side portion of the appliance. The information light device includes a light guide that extends along a substantial length of the side portion and is configured to emit light in accordance with an on/off status of the appliance.

Another aspect of the invention relates a method of indicating an operating status of a household appliance comprising the steps of providing a light guide on an appliance; generating light by a light source through the light guide when the appliance is in operation; and projecting the light onto an exterior surface of the appliance or a surface adjacent the appliance.

Another aspect of the invention relates a household appliance comprising a main body, at least one light emitting diode (LED) disposed in an upper portion of the main body, and a door pivotally coupled to the main body, wherein the LED is configured to emit light in accordance with an on/off status of the appliance, the LED is configured to project the light away from the LED such that the light appears as an area of light on a surface, and the surface is part of the door or part of a member adjacent the door.

BRIEF DESCRIPTION OF THE DRAWINGS

These and other features of this disclosure will be more readily understood from the following detailed description of the various aspects of the disclosure taken in conjunction with the accompanying drawings that depict various exemplary embodiments of the disclosure, in which:

FIG. 6-1 is a cross-sectional view along the line 6-1-6-1 in FIG. 6;

FIG. 6-2 is an enlarged detail taken from FIG. 6-1;

FIG. 7-1 is a cross-sectional view similar to FIG. 6-2 showing an adjustment mechanism for adjusting a location of the light guide according to another embodiment of the invention;

FIG. 9 is a top view of the dishwasher door of FIG. 8;

FIG. 9-1 is a cross-sectional view along the line 9-1-9-1 in FIG. 9;

FIG. 9-2 is an enlarged detail taken from FIG. 9-1;

FIG. 11-1 is a cross-sectional view along the line 11-1-11-1 in FIG. 11;

FIG. 11-2 is an enlarged detail taken from FIG. 11-1;

FIG. 13-1 is a cross-sectional view along the line 13-1-13-1 in FIG. 13;

FIG. 13-2 is an enlarged detail taken from FIG. 13-1;

FIG. 14-1 is an enlarged detail taken from a cross-sectional view of a dishwasher according to another embodiment of the invention similar to the view in FIG. 13-2;

FIG. 18-1 is a cross-sectional view along the line 18-1-18-1 in FIG. 18;

FIG. 18-2 is an enlarged detail taken from FIG. 18-1;

FIG. 20 is a front view of the light guide of FIG. 19;

FIG. 21 is a right side view of the light guide of FIG. 19;

FIG. 22 is a left side view of the light guide of FIG. 19; and

FIGS. 23-1 and 23-2 are block diagrams representing a process of indicating an operating status of a household appliance according to an exemplary embodiment of the invention.

Figure 1:
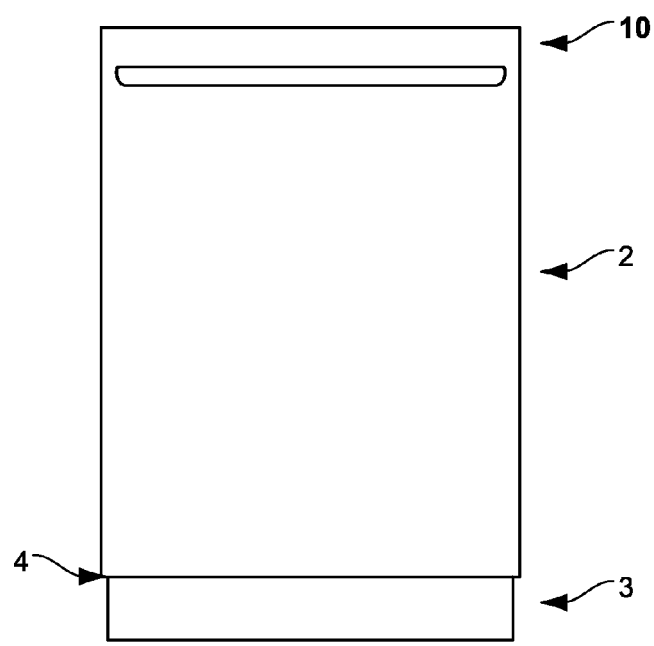
FIG. 1 is a front view of a household appliance including an information light device known as an "infolight glow" according to an exemplary embodiment of the invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

FIG. 1 shows an exemplary embodiment of a household appliance of the present invention, such as a dishwasher 10. The dishwasher 10 may comprise a door 2 which is suitable for tiltable opening via a pivotable connection to the dishwasher. On a lower side of the door 2, the dishwasher 10 may include a base cover or toe panel 3. The base cover/toe panel 3 may protect a user of the dishwasher 10 from inadvertently accessing a space where the electronics and other functional components (not shown) of the dishwasher 10 may be located, thereby protecting both the user for safety purposes and the electronic components from damage. The dishwasher 10 may further include a door seal 4 plugged onto the base cover/toe panel 3 to seal a space between the door 2 of the household appliance and the toe panel 3.

On a lower side of the door 2 or base cover/toe panel 3, the dishwasher may include an information light device 20 known as an "infolight glow" that produces a band or stripe of light on a floor of the dishwasher across a substantially large width of the dishwasher to indicate an operating status of the dishwasher. The information light device 20 is configured to produce the stripe of light when the on/off status of the dishwasher is "on," or in other words, during a wash cycle. Not only does the information light device 20 project light over a larger area on the floor which increases visibility particularly from relatively far distances (e.g., across a room), but the information light device 20 also produces a glow as compared to the "infolight spot" which also enhances visibility especially from relatively far distances.

Figure 2:
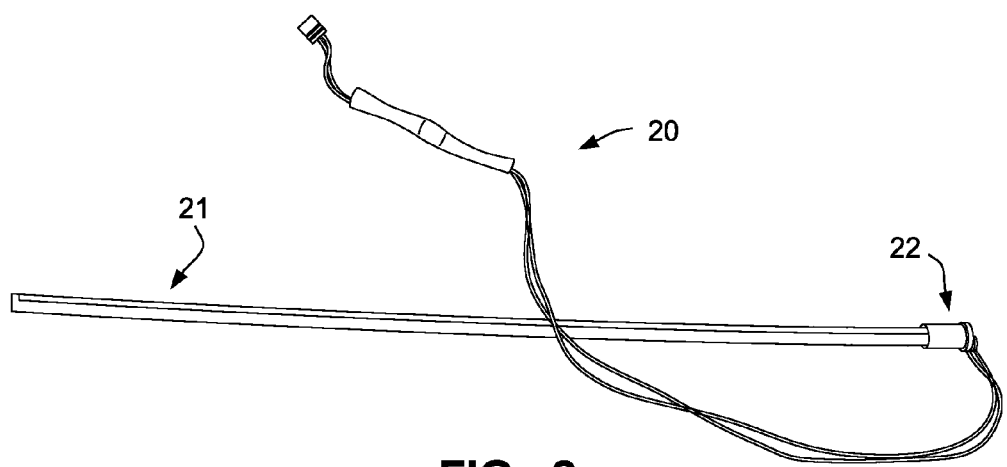
FIG. 2 depicts a light guide according to an exemplary embodiment of the invention.

FIG. 2 depicts an information light device 20 according to an exemplary embodiment of the invention. The information light device 20 may include a housing 21 as a light guide or wave guide as known in the art and shown in FIGS. 2 and 19-22. A light source 22 may be disposed on at least one end of the light guide 21, wherein the light source 22 generates light that travels through the light guide 21. The light guide 21 may be structured to allow at least part of the light to exit the light guide 21 in a direction that is perpendicular to the light guide and onto the floor. The light guide 21 may be formed of a side glow fiber or other material known in the art for use as a light guide or wave guide. Further, the light source 22 may be a light-emitting diode (LED).

Figure 3:
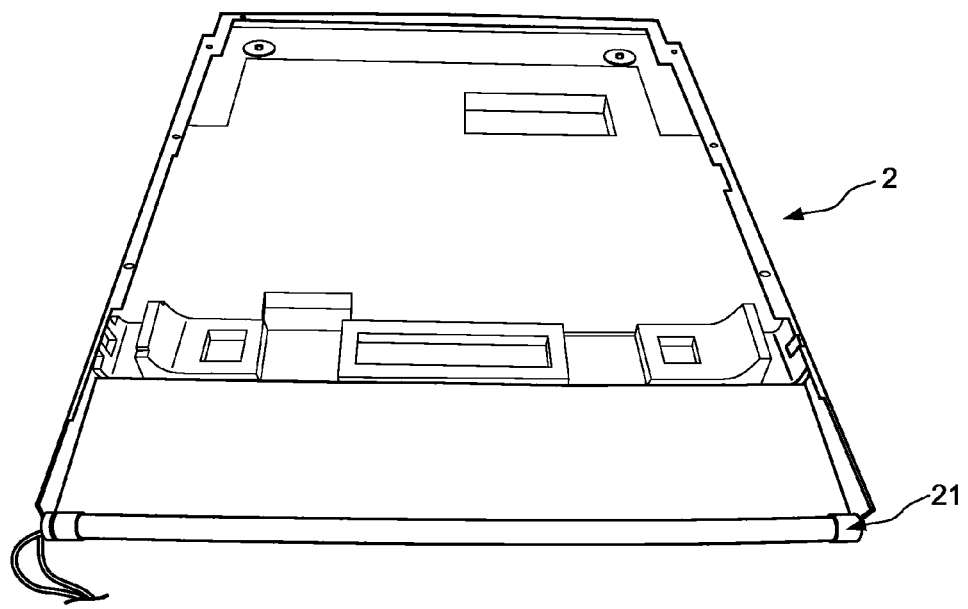
FIG. 3 depicts the light guide of FIG. 2 disposed on an inside at a bottom area of a door of the household appliance according to an exemplary embodiment of the invention.
Figure 4:
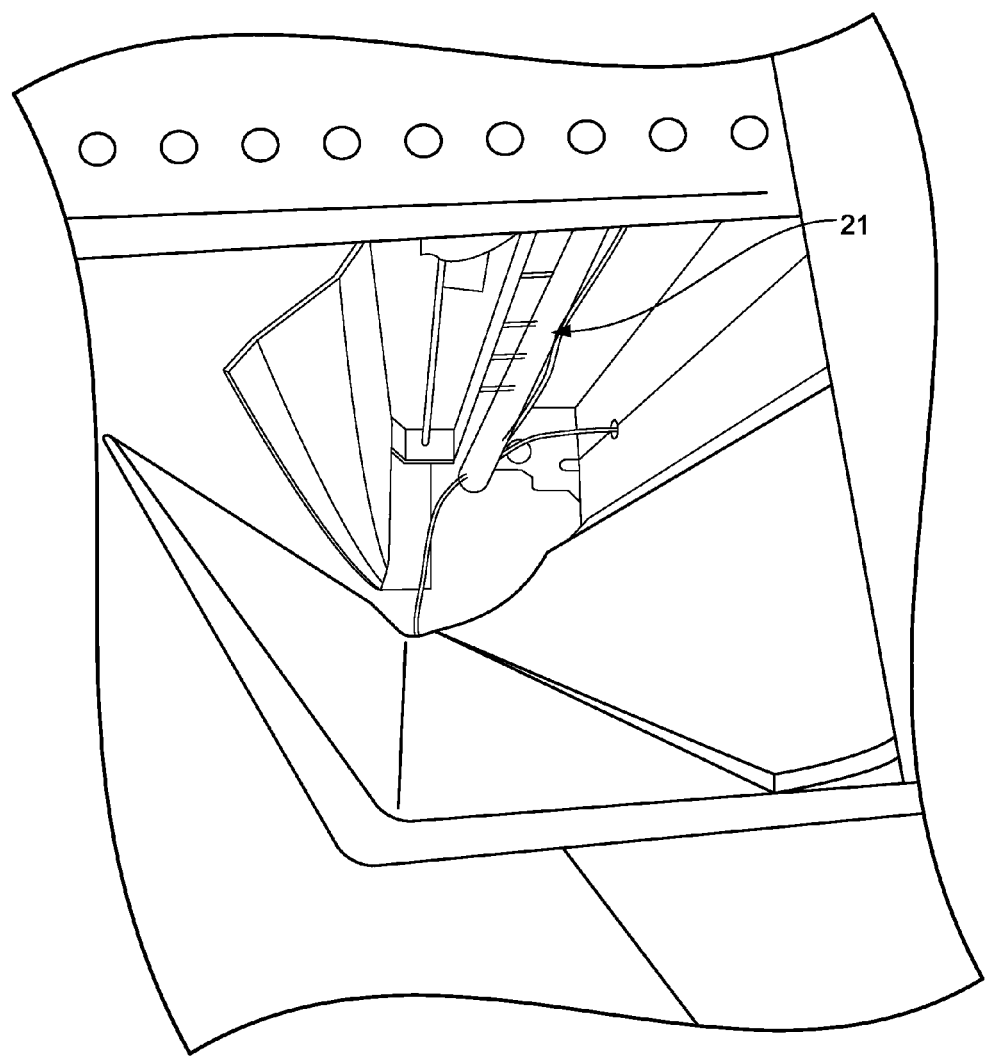
FIG. 4 depicts the light guide of FIG. 2 assembled on a bottom surface of the household appliance, such as on a lower side of a toe panel according to an exemplary embodiment of the invention.

The light guide 21 may be placed on the household appliance in locations that allow for light to shine in a band or stripe of light along the floor on which the dishwasher is disposed. FIG. 3 depicts the light guide 21 disposed on an inside at a bottom area of the door 2. FIG. 4 depicts the light guide 21 assembled on a bottom surface of the dishwasher, such as on a lower side of the toe panel 3. As depicted in FIGS. 3 and 4, the length of the light guide may be about equal to the width of the dishwasher/household appliance 10.

The door seal 4 that seals a space between the door 2 of the dishwasher/household appliance 10 and the toe panel 3 may be formed, for example, from a transparent Polyvinyl chloride (PVC) material that allows the light exiting the light guide 21 to travel from the light guide 21, through the door seal 4, and onto a floor where the household appliance is disposed. Of course, other materials may be used for the door seal 4 that typically include a hard component for support and a soft component for flexibility. Further, in another embodiment of the dishwasher/household appliance 10, the door seal 4 may be disposed of entirely so that the light that perpendicularly exits the light guide 21 shines directly onto the floor.

To ensure that the band or stripe of light along the floor of the dishwasher/household appliance 10 is crisp or clear, one or more lenses (not shown) may be included to focus the light that exits the light guide 21.

Figure 5:
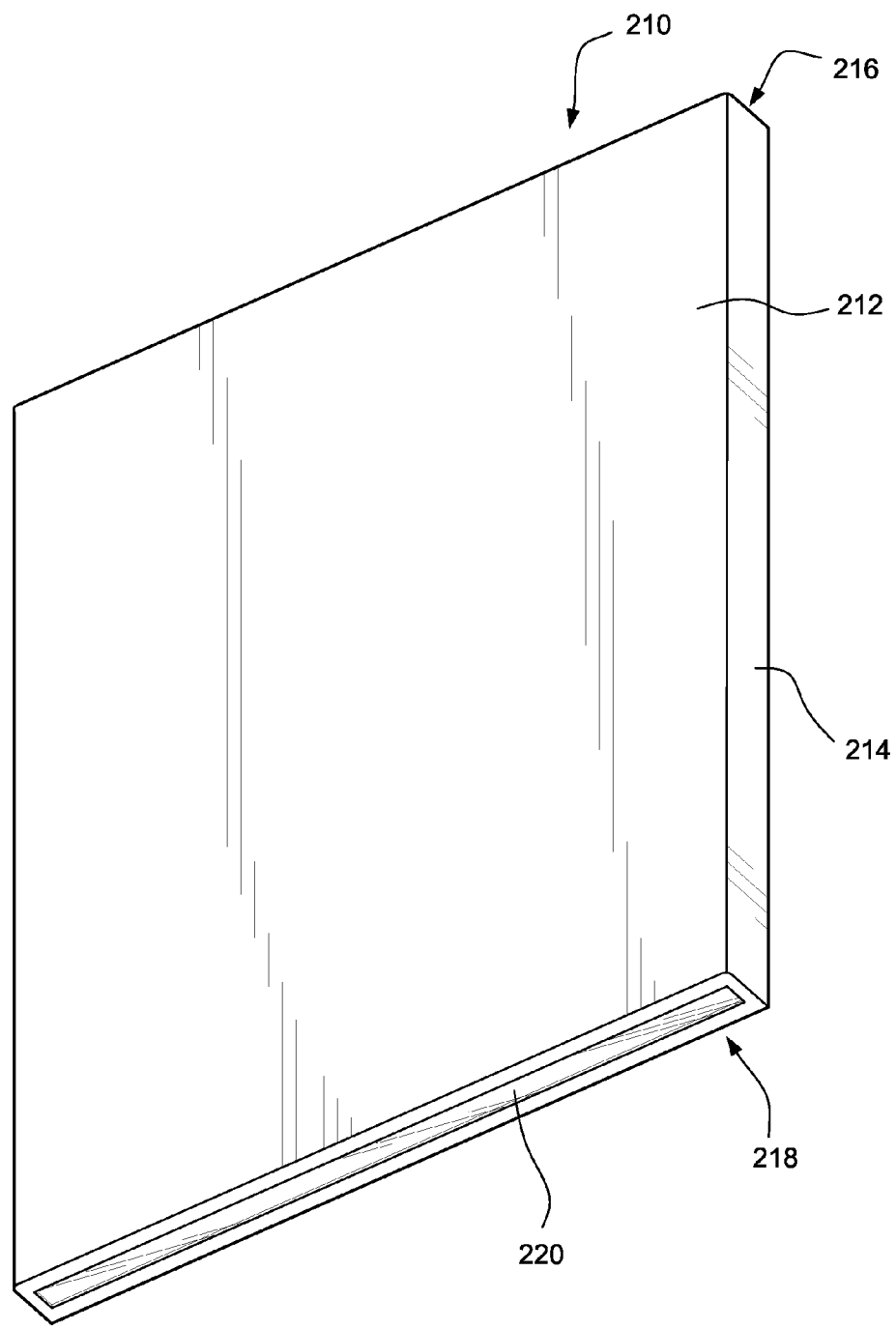
FIG. 5 is a perspective view of a dishwasher door having a light guide in a lower portion thereof according to another embodiment of the invention.
Figure 6:
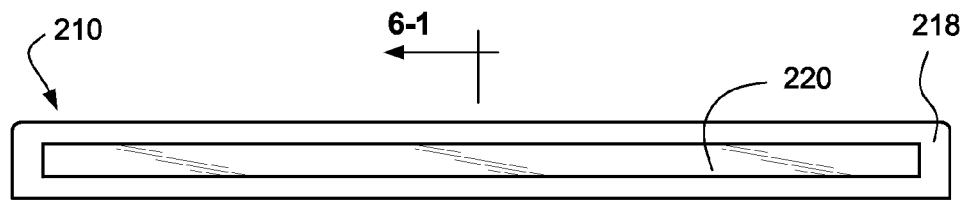
FIG. 6 is a bottom view of the dishwasher door of FIG. 5.
Figures 1, 6:
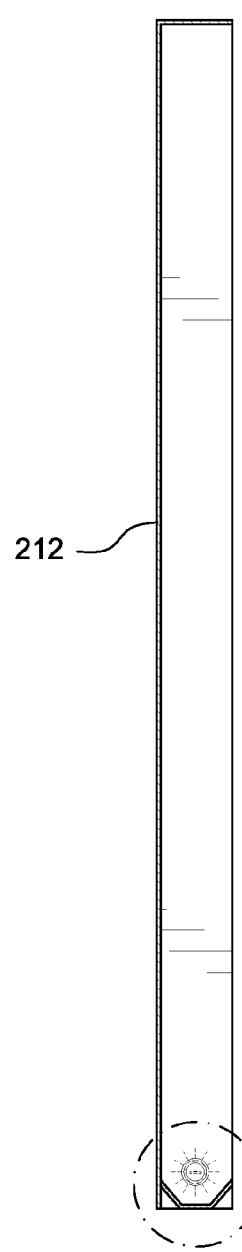
Figures 2, 6:
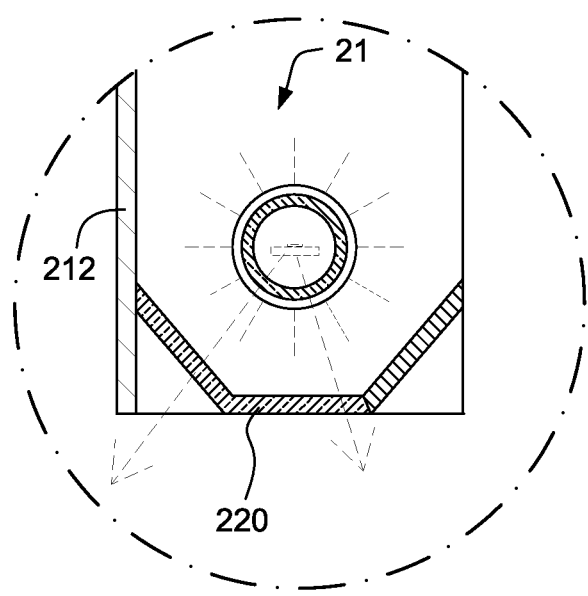

In another embodiment shown in FIGS. 5 to 6-2, a dishwasher door 210 may include a window 220 in a bottom surface 218 thereof through which light from the light guide 21 is projected onto the floor adjacent the door 210. The "windows" described herein include openings fitted with a transparent material. It is noted that inclusion of the transparent material is optional. As best shown in FIG. 5, the door 210 also includes side surfaces 214 (only one is shown), a front surface 212, and a top surface 216. Referring particularly to FIG. 6-2, the light guide 21 extends along a bottom portion of the door 210 and projects light through the window 220. The transparent material of the window 220 may have a planar configuration, or may be angled as shown in FIG. 6-2.

Figure 7:
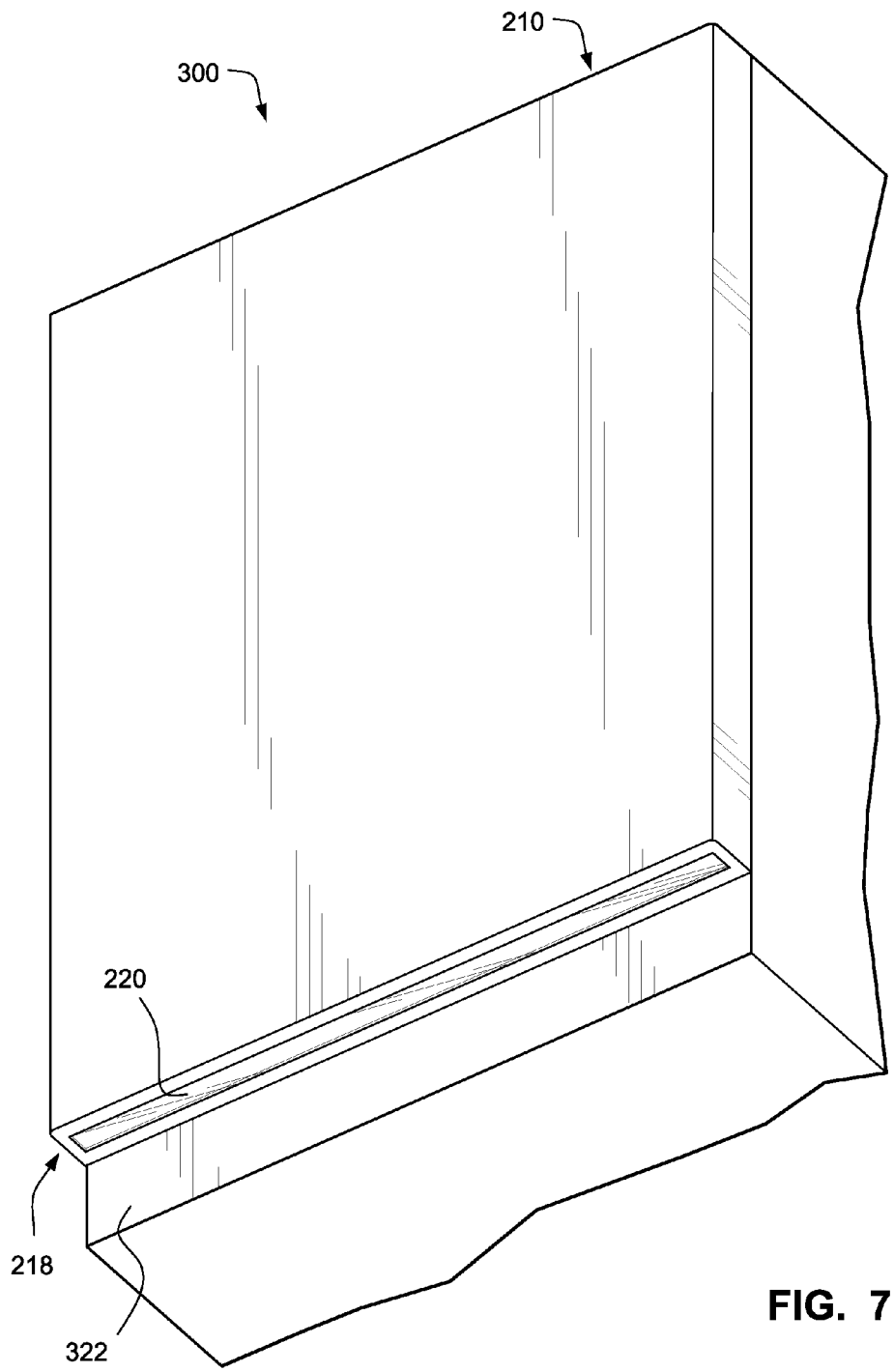
FIG. 7 is a partial perspective view of a dishwasher having a toe panel and including a door having a light guide in a lower portion thereof according to another embodiment of the invention.
Figures 1, 7:
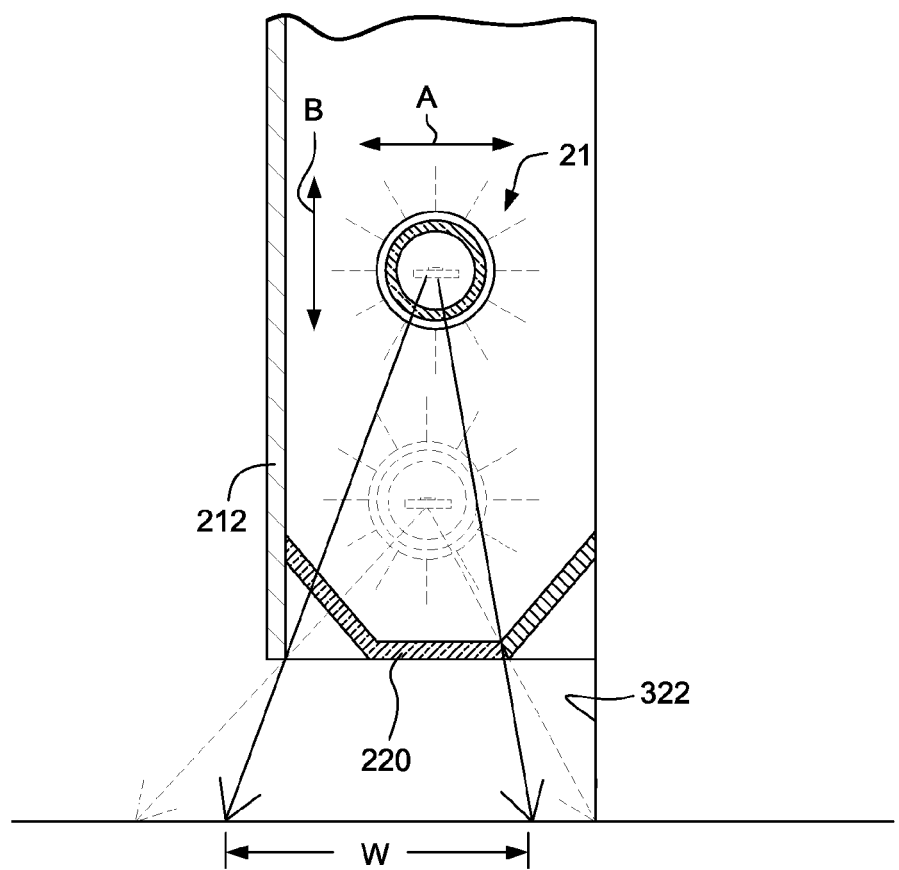

In another embodiment, a dishwasher 300 includes a toe panel 322 below the door 210, as shown in FIG. 7.

Additionally, the location of the light guide 21 in the dishwasher may be adjusted to control the location and/or width W of the band or stripe of light which appears on the floor, as shown for example in FIG. 7-1. The dishwasher may include a mechanism for adjusting the location of the light guide both horizontally in the directions of the arrow A and vertically in the directions of the arrow B. The mechanism may be used to prevent the band or stripe of light from appearing on the toe panel 322.

Instead of projecting light onto the floor adjacent the dishwasher, the light guide may be arranged in a top portion of the dishwasher door to project light onto an adjacent surface (e.g., underside of countertop, recessed handle area of dishwasher).

Figure 8:
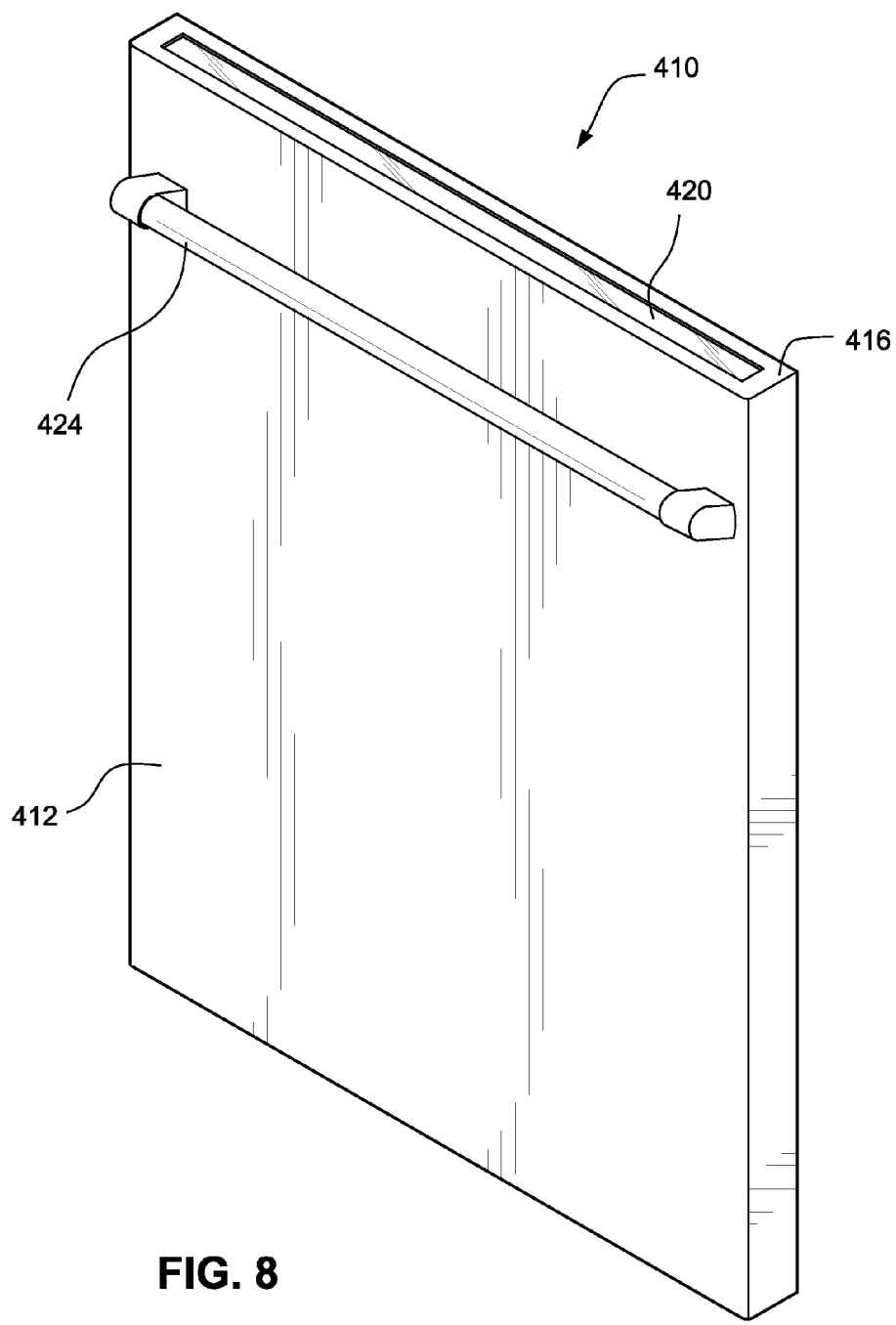
FIG. 8 is a perspective view of a dishwasher door having a light guide in an upper portion thereof according to another embodiment of the invention.

For example, in an embodiment shown in FIGS. 8 to 9-2, a dishwasher door 410 may include a window 420 in a top surface 416 thereof through which light from a light guide 21 is projected above the door 410 and onto a surface (e.g., underside of countertop) adjacent the door. The door 410 may include a handle 424 disposed on a front surface of the door which a user may grasp to aid in opening the door 410.

Figure 10:
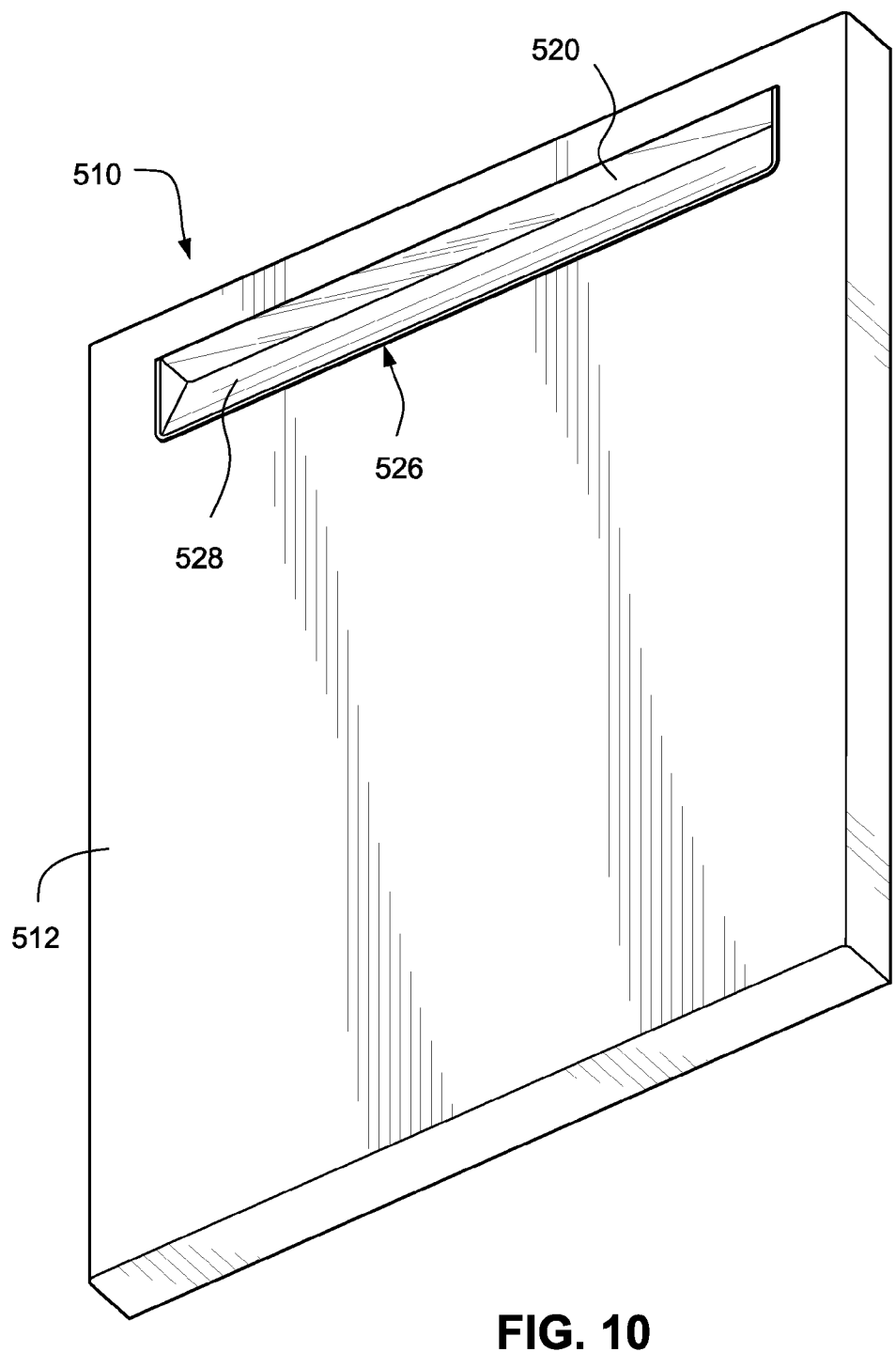
FIG. 10 is a perspective view of a dishwasher door having a recessed handle area and a light guide disposed in an upper portion of the door according to another embodiment of the invention.
Figure 11:
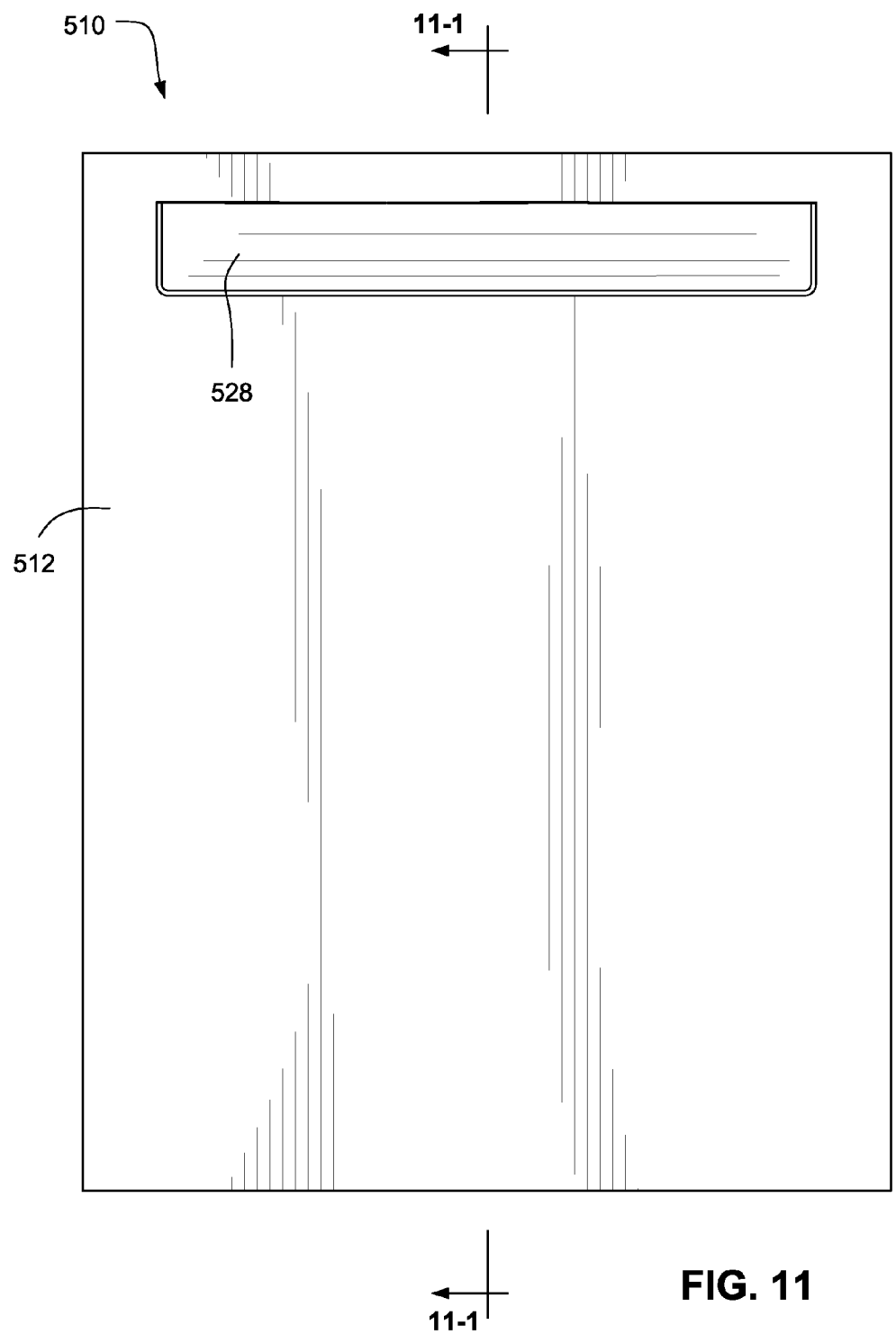
FIG. 11 is a front view of the dishwasher door of FIG. 10.
Figures 1, 2, 11:
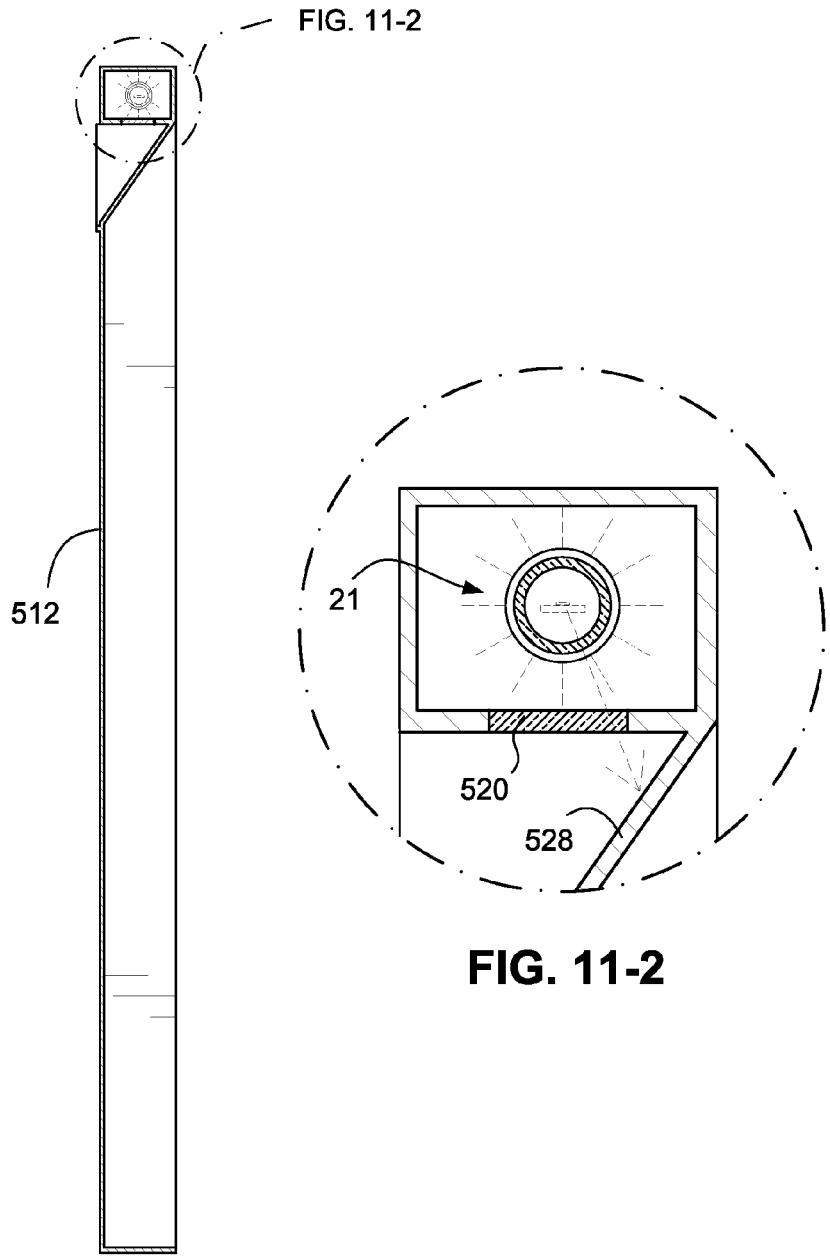

Turning to FIGS. 10 to 11-2, in another embodiment, a dishwasher door 510 includes a recessed handle area 526 disposed on a front surface 512 thereof. The recessed handle area 526 is recessed into the front surface 526 and may include a handle portion to aid in opening/closing the door. The recessed handle area 526 includes a window 520 extending in the width direction of the door 510 and an adjacent inclined surface 528. The light guide 21 is disposed in an upper portion of the door 510 and projects light downwardly through the window 520 and onto the inclined surface 528 where the light is visible to a user.

Figure 12:
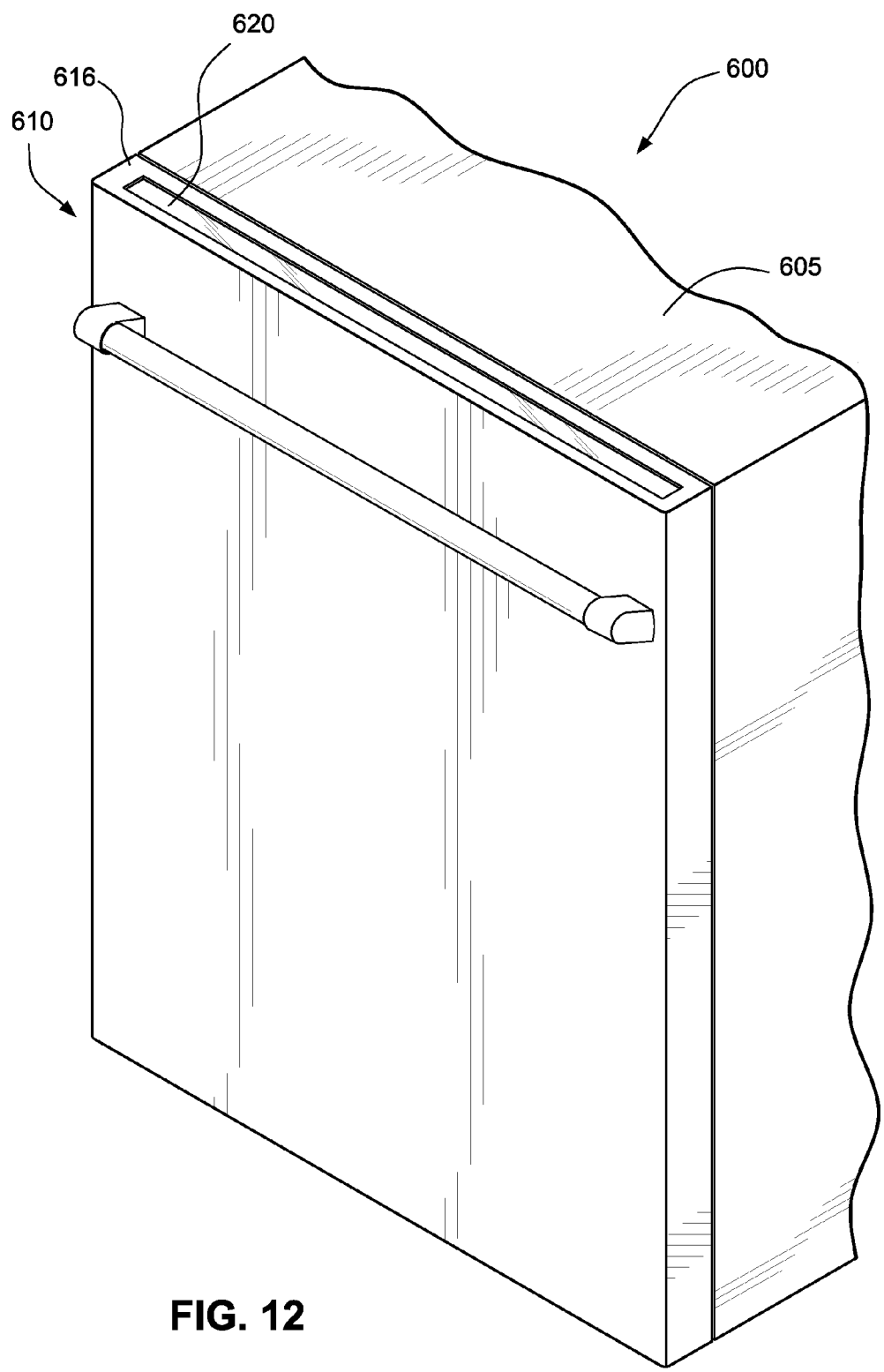
FIG. 12 is a partial perspective view of a dishwasher having a light guide in an upper portion thereof according to another embodiment of the invention.
Figure 13:
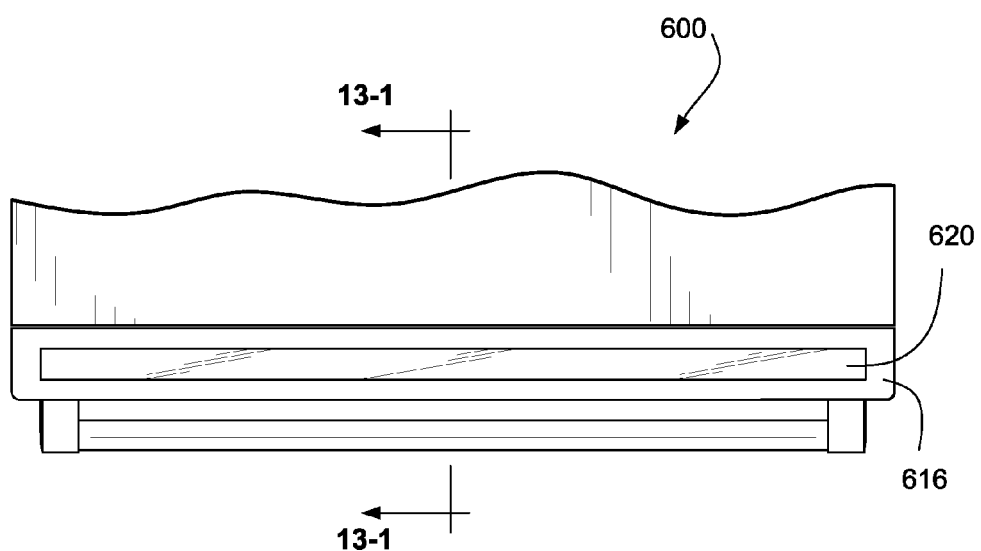
FIG. 13 is a top view of the dishwasher of FIG. 12.
Figures 1, 13:
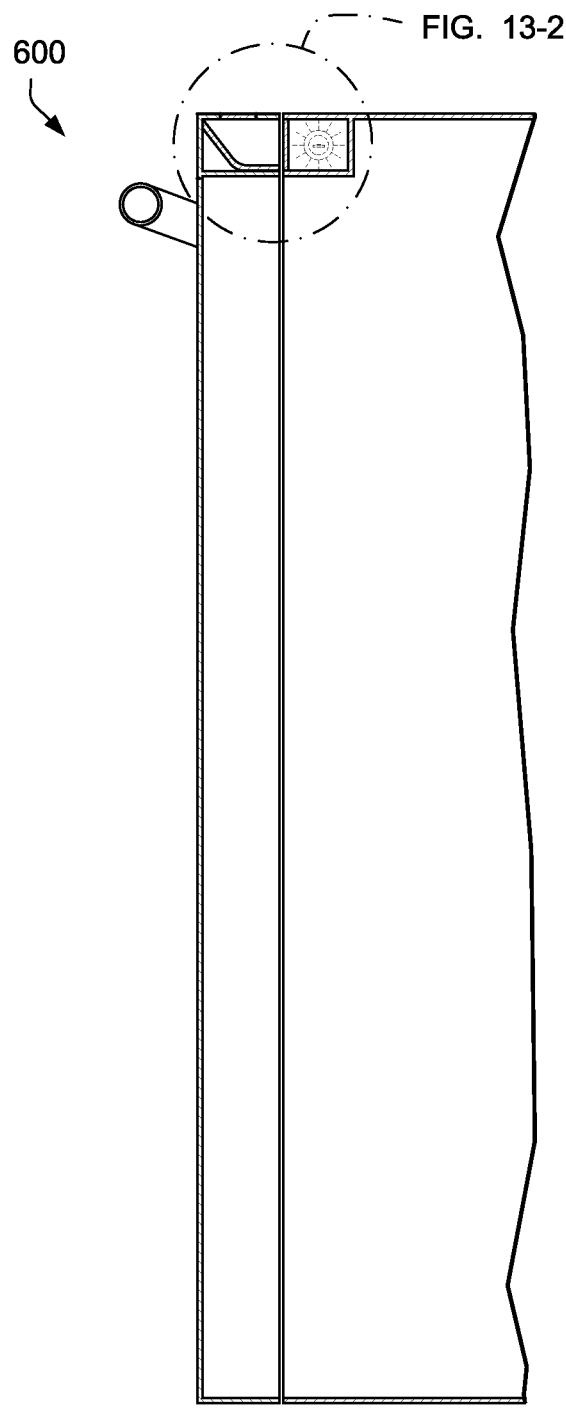
Figures 2, 13:
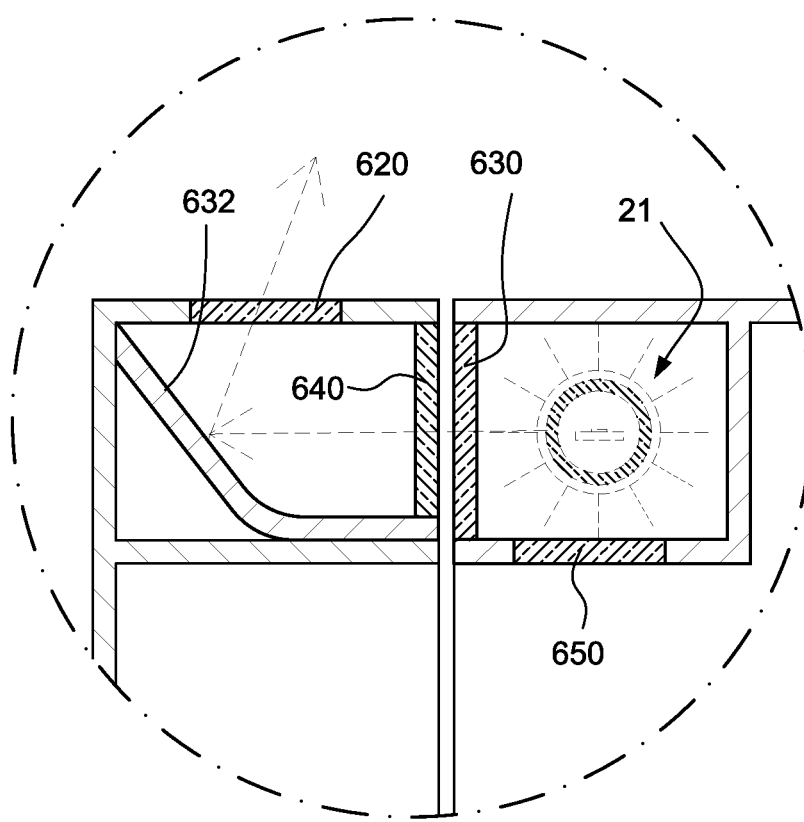

In another embodiment, a dishwasher 600 includes a main body 605 and a door 610, as shown in FIGS. 12 to 13-2. The door 610 includes a window 620 in a top surface 616 thereof. A light guide 21 is disposed in an upper portion of the main body 605. The light guide 21 projects light through an interior window 630 in the main body 605 and into an adjacent upper portion of the door 610 which includes a window 640. The upper portion of the door 610 also houses a reflector 632 which reflects the light through the window 620 formed in the top surface 616 of the door 610. The reflector 632 may be angled appropriately to direct the light as desired.

The main body 605 may also include a window 650 below the light guide which may be utilized to direct light downwardly into the main body 605 of the dishwasher when the door 610 is open. The light may have a blue or red hue to provide an aesthetically appealing effect. It will be appreciated that other colors may be used.

Figure 14:
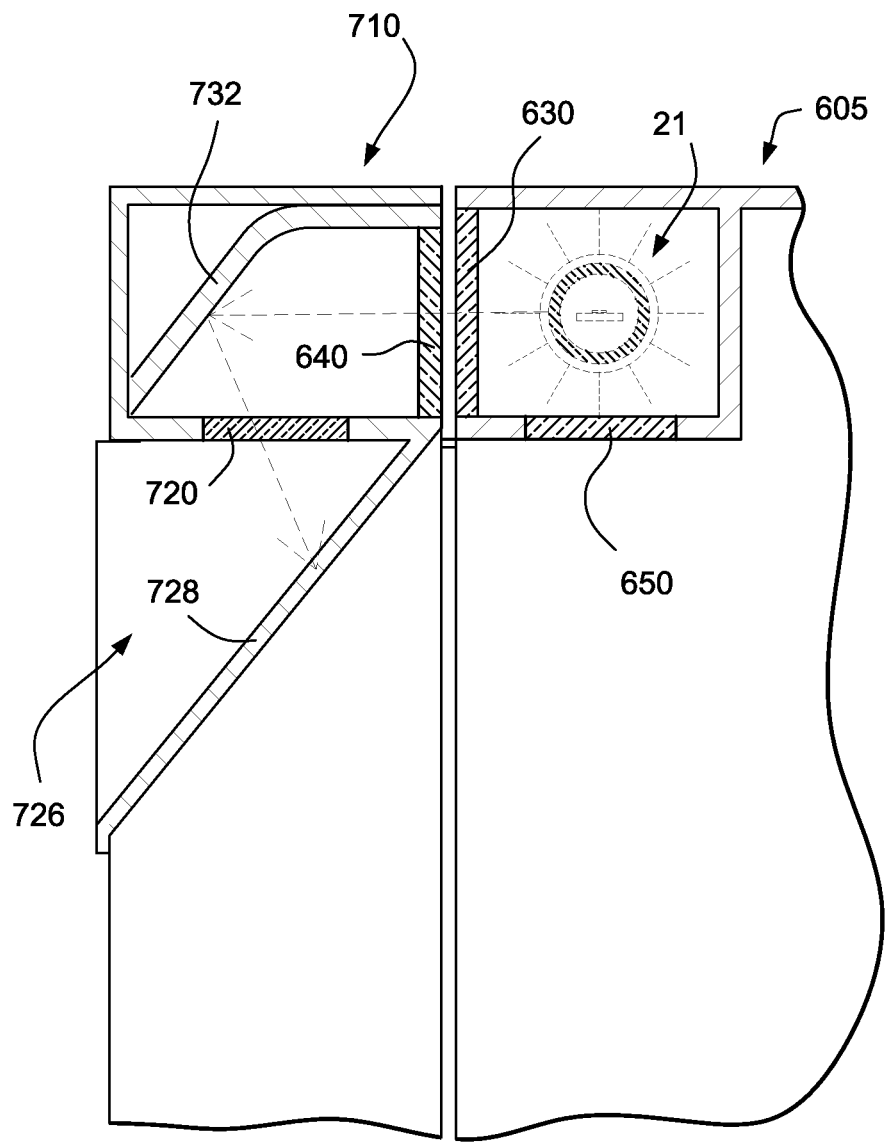
FIG. 14 is an enlarged detail taken from a cross-sectional view of a dishwasher according to another embodiment of the invention similar to the view in FIG. 13-2.
Figures 1, 14:
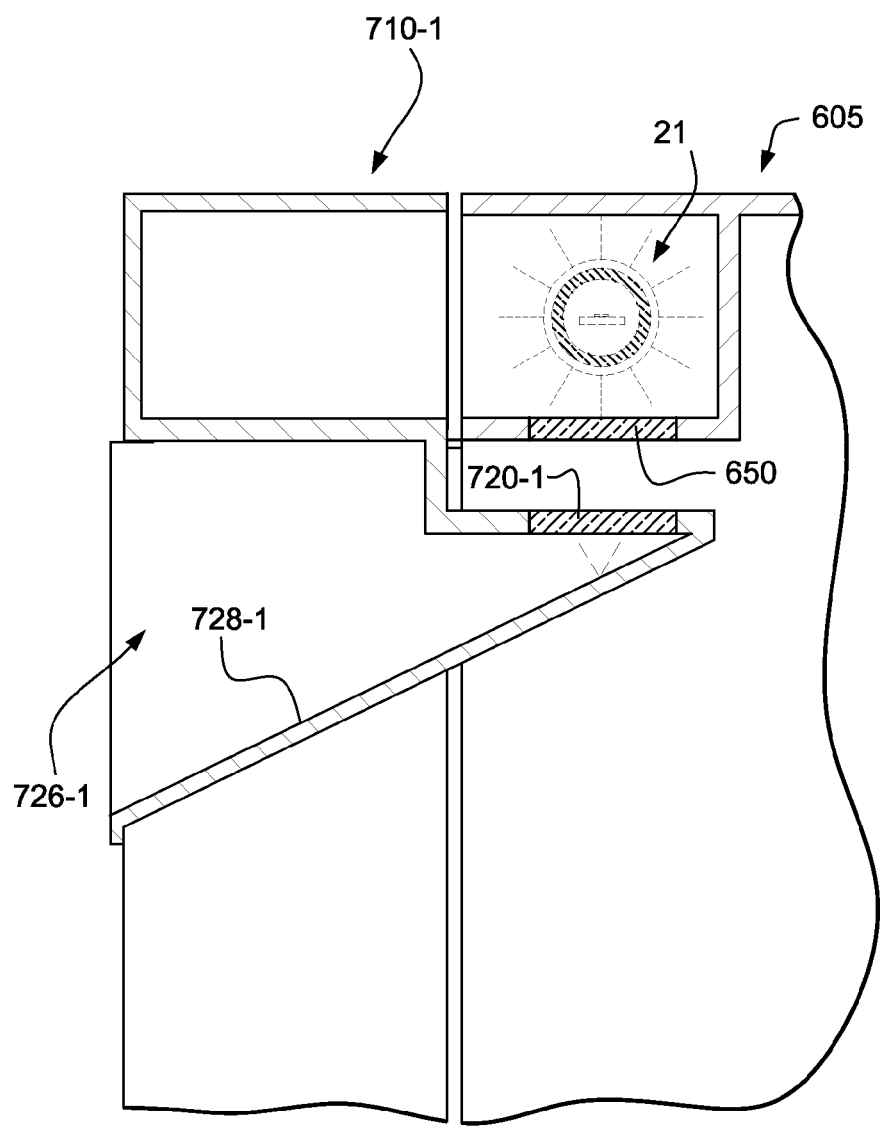

In yet another embodiment, a door 710 having a recessed handle area 726 may be used with the main body 605, as shown in FIG. 14. The recessed handle area 726 includes a window 720 extending in the width direction of the door 710 and an adjacent inclined surface 728. In this configuration, the upper portion of the door 710 houses a reflector 732 which reflects the light downwardly through the window 720 and onto the inclined surface 728 in the recessed area 726. The reflector 732 may be angled appropriately to direct the light as desired. In another embodiment, shown in FIG. 14-1, the recessed handle area 726-1 may extend into an interior of the main body 605 when the door 710-1 is closed. By this arrangement, light from the light guide 21 may be directed downwardly through a window 720-1 in the recessed handle area and onto the inclined surface 728-1.

Figure 15:
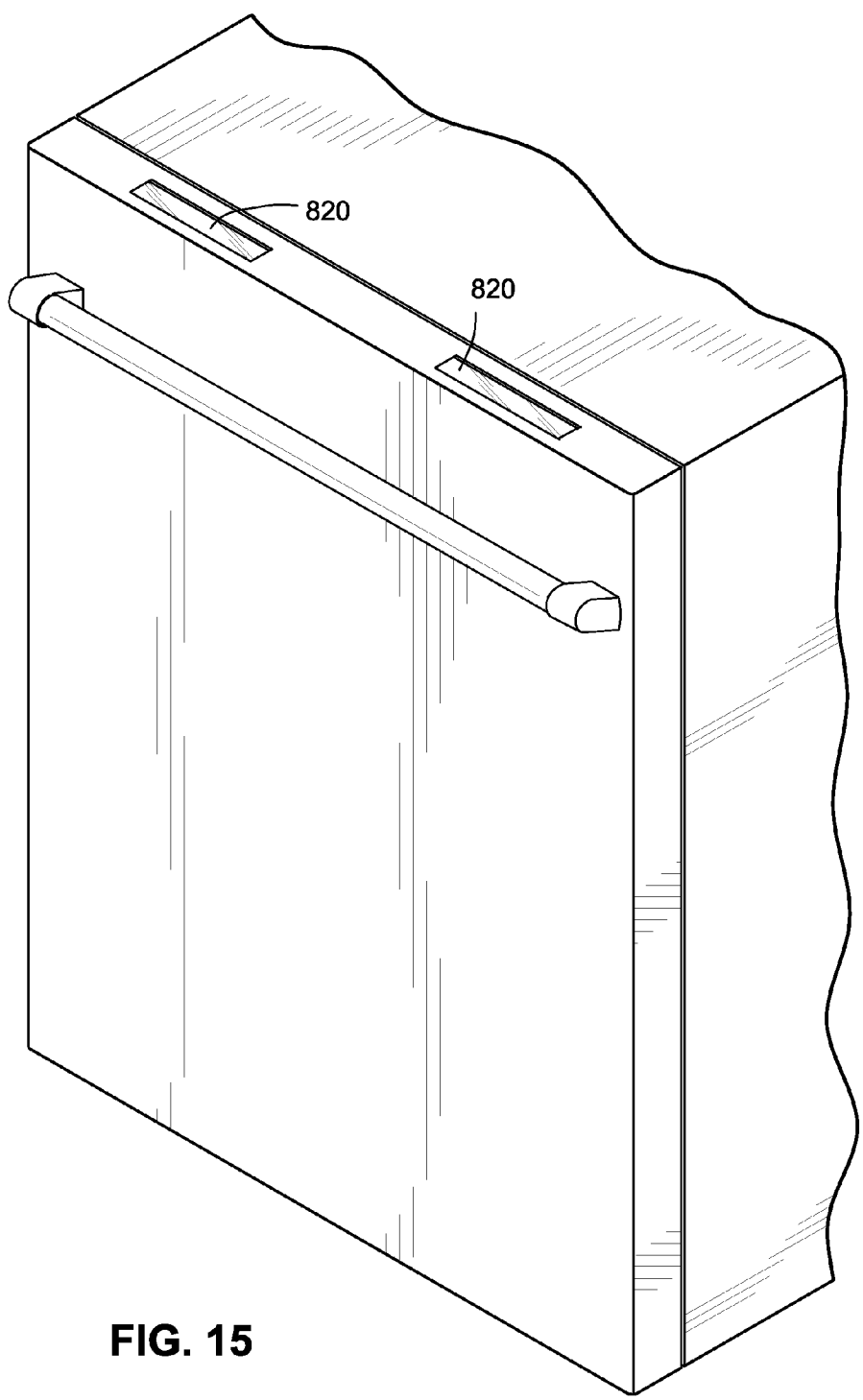
FIG. 15 is a partial perspective view of a dishwasher having light guides or LED's in an upper portion thereof according to another embodiment of the invention.
Figure 16:
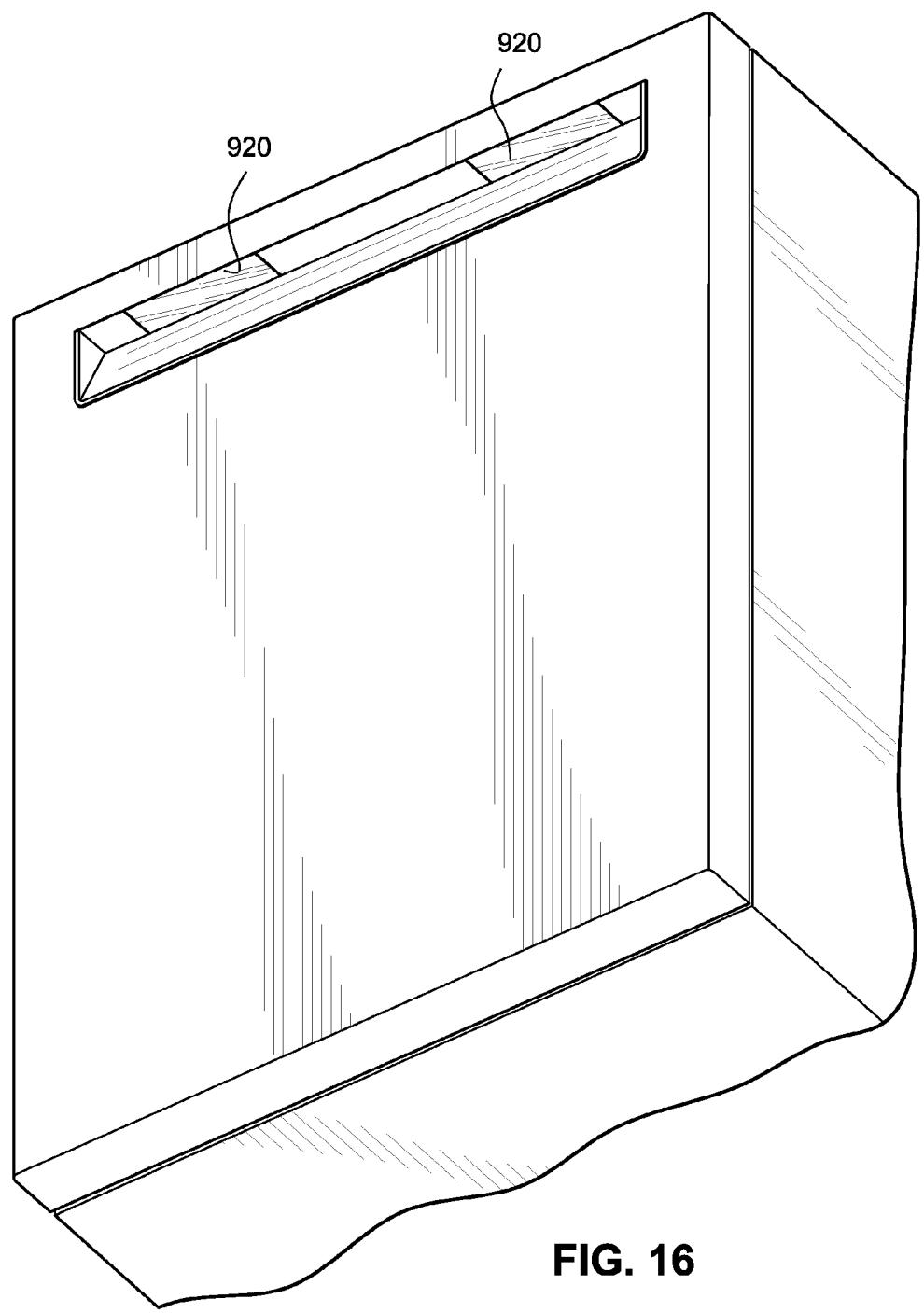
FIG. 16 is a partial perspective view of a dishwasher having light guides or LED's in an upper portion thereof and a door with a recessed handle area according to another embodiment of the invention.
Figure 17:
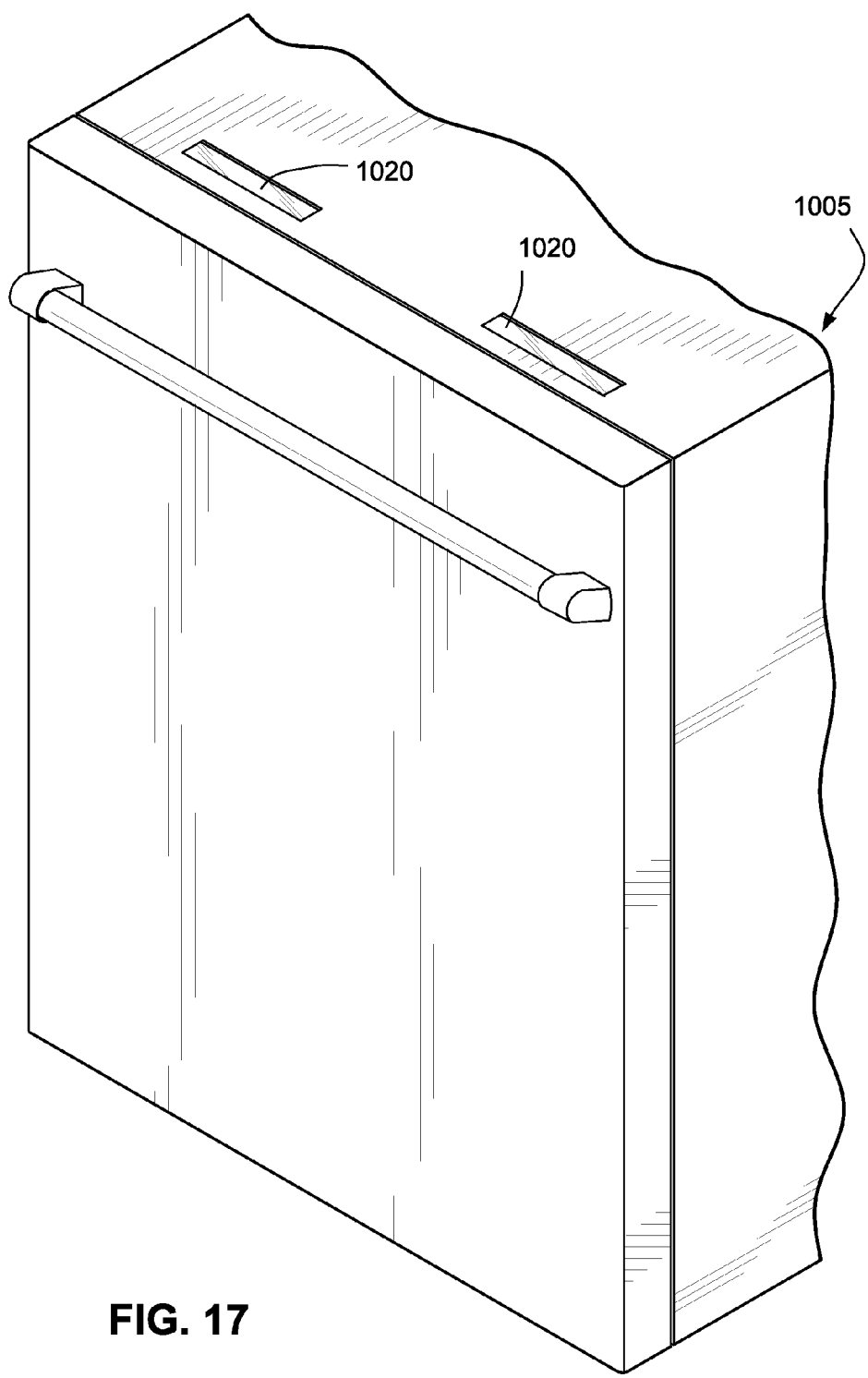
FIG. 17 is a partial perspective view of a dishwasher having light guides or LED's in an upper portion thereof according to another embodiment of the invention.
Figure 18:
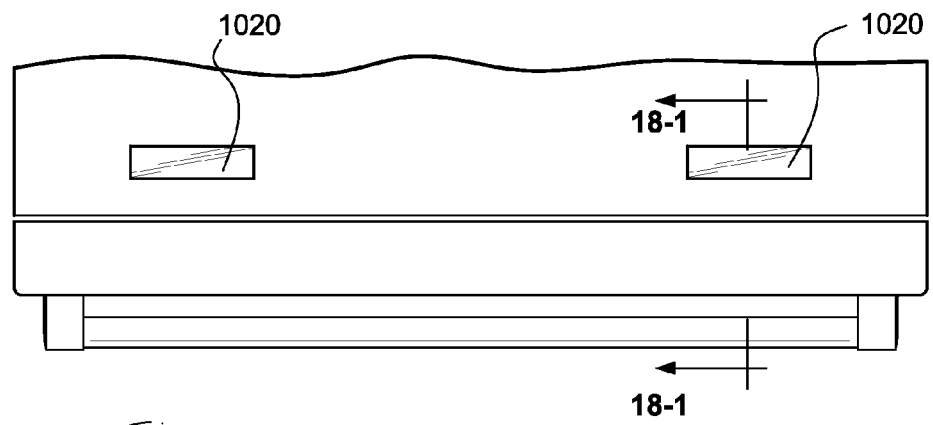
FIG. 18 is a top view of the dishwasher of FIG. 17.
Figures 1, 18:
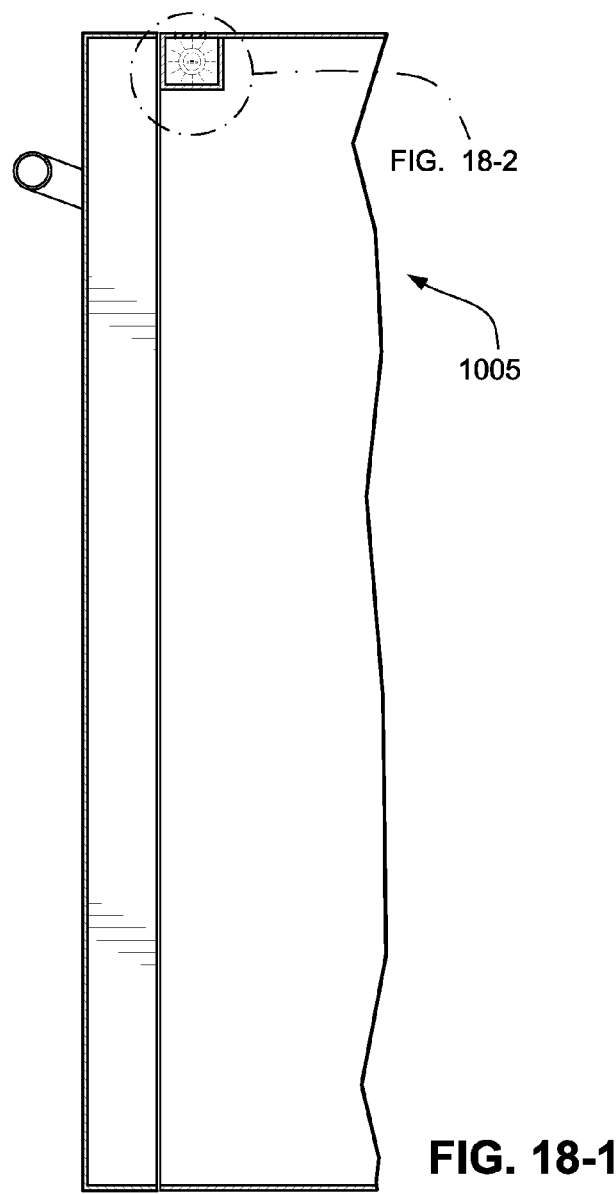
Figures 2, 18:
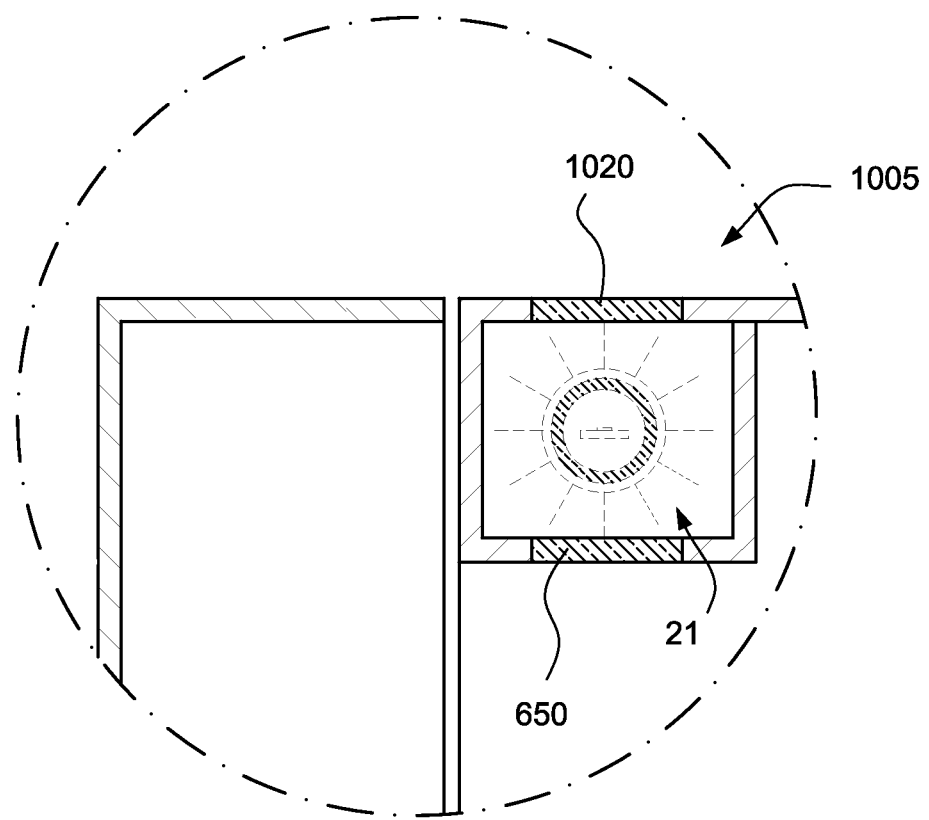
Figure 19:
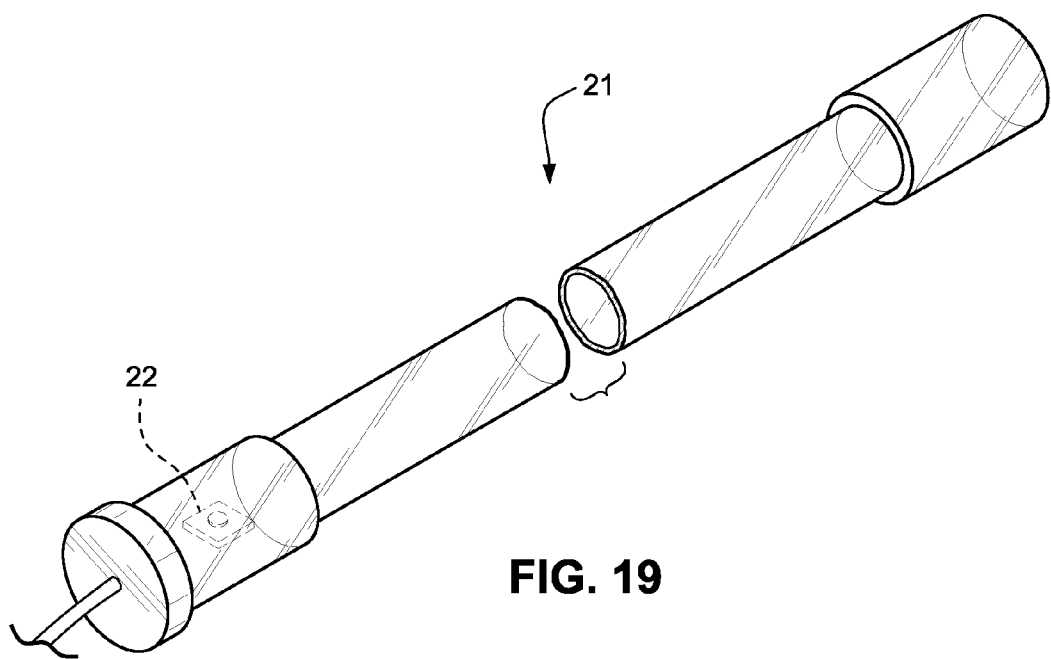
FIG. 19 is a perspective view of the light guide of FIG. 2.

In alternative embodiments the light guide 21 may only extend partially across a width of the dishwasher. Multiple light guides may also be used. Additionally, to meet space requirements, the information light device 20 may exist only of an LED. For instance, the arrangements shown in FIGS. 12 to 13-2 and 14 may be modified as shown in FIGS. 15 and 16 to include two shorter spaced-apart light guides (or two spaced-apart LED's) 21. As a result, the top surface of the door may include two spaced-apart windows 820 aligned with the light guides or LED's, as shown in FIG. 15. Likewise, in an embodiment including a recessed handle area, light may be directed downwardly through two spaced-apart windows 920, as shown in FIG. 16. In yet another embodiment, a dishwasher main body 1005 may include the spaced-apart light guides or LED's 21 and may be configured to direct the light directly upwardly through windows 1020 formed in the main body, as shown in FIGS. 17 to 18-2.

It is noted that the windows described herein may be open areas or areas including a material sufficiently transparent to allow the light to pass therethrough. Further, the information light device may be disposed near any side of the appliance (e.g., dishwasher) or appliance door, including lateral sides in addition to the upper and lower regions described herein.

Figures 1, 23:
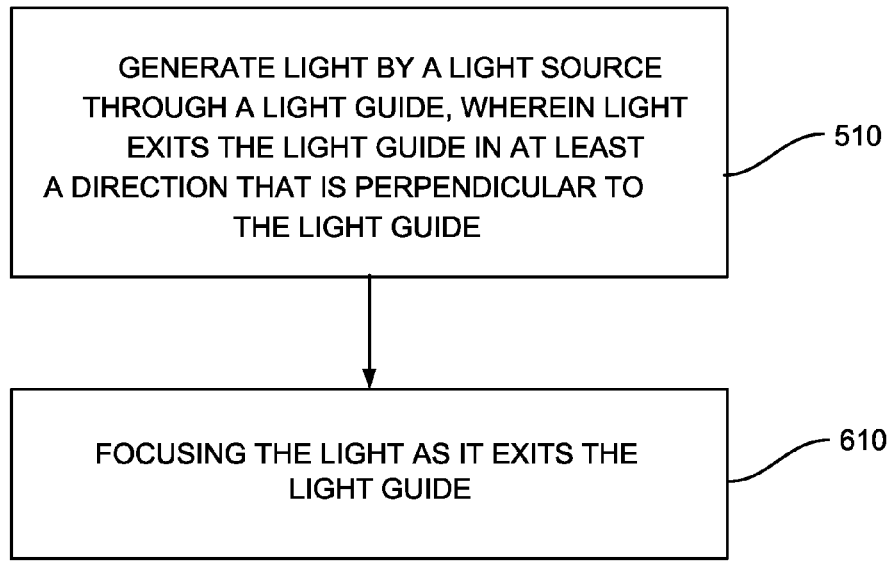
Figures 2, 23:
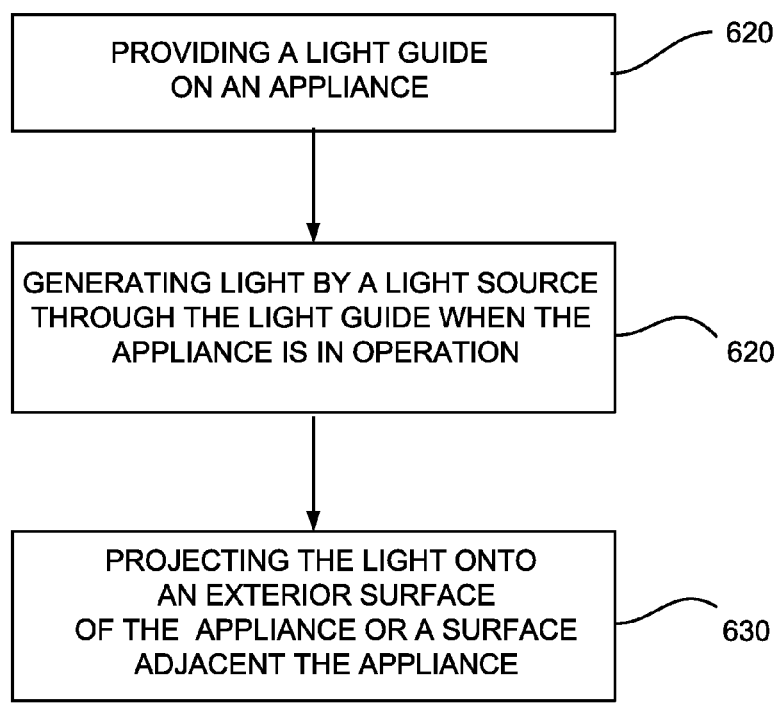

An exemplary method of the invention is depicted in FIG. 23-1. In step 510, the method may include generating light by a light source through a light guide, wherein light exits the light guide in at least a direction that is perpendicular to the light guide. In step 520, the method may include focusing the light as it exits the light guide.

In another example represented in FIG. 23-2, the method may include a step 610 of providing a light guide on an appliance. In step 620, the method may include generating light by a light source through the light guide when the appliance is in operation. In step 630, the light is projected onto an exterior surface of the appliance or a surface adjacent the appliance.

The appliance (e.g. dishwasher) may include a controller having at least one programmable processor that is controlled by instructions on a computer readable medium to implement a method according to the disclosed technology (e.g., the method steps described above).

It is noted that the steps described above are not intended to be an exhaustive list of the numerous steps of the disclosed method that may be carried out through control of a processor. Further, steps 610, 620 and 630 may each belong to a separate method, or may be implemented as part of any of steps 510 and 520, or may further be carried out as separate steps in any suitable order with regard to steps 510 and 520.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A household appliance, comprising:
   a main body;
   a door pivotally coupled to the main body;
   an information light device including an elongate light guide disposed on the main body and adjacent a side of the main body so as to extend along a substantial length of the side of the main body, the information light device being configured to emit light in accordance with a status of the appliance; and
   a light source arranged to generate light that travels through the light guide in a longitudinal direction of the light guide,
   wherein the light guide is structured and arranged to distribute the light from the light guide in a direction that is perpendicular to the longitudinal direction such that said distributed light is visible to a user.

2. The household appliance according to claim 1, wherein the light guide is a wave guide.

3. The household appliance according to claim 1, wherein the light source is disposed in at least one end portion of the light guide.

4. The household appliance according to claim 3, wherein the light source is a light-emitting diode (LED).

5. The household appliance according to claim 1, wherein the light guide projects the light onto the door or a surface adjacent the door.

6. The household appliance according to claim 5, wherein the side of the main body is a top of the main body.

7. The household appliance according to claim 5, wherein the light is configured to appear as a stripe of light on a surface of the door or the surface adjacent the door.

8. The household appliance according to claim 7, wherein the surface of the door is in a recessed handle area of the door.

9. The household appliance according to claim 7, wherein the surface adjacent the door is an underside of a countertop.

10. The household appliance according to claim 1, wherein the light guide is disposed on an upper portion of the main body and the light is configured to appear as a stripe of light on a surface of the door or a surface adjacent the door.

11. The household appliance according to claim 10, wherein the light is transmitted through the door.

12. The household appliance according to claim 10, wherein the surface of the door is in a recessed handle area of the door.

13. The household appliance according to claim 10, wherein the surface adjacent the door is an underside of a countertop.

14. The household appliance according to claim 1, further comprising one or more lenses structured to focus the light that exits the light guide.

15. The household appliance according to claim 1, wherein a length of the light guide is about equal to a width of the household appliance.

16. A household appliance, comprising:
 a main body;
 at least one light emitting diode (LED) disposed in an upper portion of the main body; and
 a door pivotally coupled to the main body, the door having a recessed handle area formed therein to facilitate opening the door,
 wherein the LED is configured to emit light in accordance with a status of the appliance, the LED is configured to project the light away from the LED such that the light appears as an area of light on the recessed handle area of the door.

17. The household appliance according to claim 16, wherein the light is transmitted through the door.

18. The household appliance according to claim 16, further comprising a reflector disposed on the door, wherein the reflector is configured to reflect the light onto the recessed handle area.

19. The household appliance according to claim 16, further comprising a window disposed on the main body, wherein the light passes through the window toward the recessed handle area.

20. The household appliance according to claim 16, wherein the at least one LED is two LED's.

\* \* \* \* \*